(12) United States Patent
Gunnarsson et al.

(10) Patent No.: US 9,999,086 B2
(45) Date of Patent: Jun. 12, 2018

(54) PACKET DATA TRANSFER RE-ESTABLISHMENT

(71) Applicant: TELEFONAKTIEBOLAGET L M ERICSSON (PUBL), Stockholm (SE)

(72) Inventors: Fredrik Gunnarsson, Linköping (SE); Walter Müller, Upplands Väsby (SE); Karl Norrman, Stockholm (SE); Stefan Wager, Espoo (FI)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 5 days.

(21) Appl. No.: 14/784,408

(22) PCT Filed: May 7, 2014

(86) PCT No.: PCT/SE2014/050561
§ 371 (c)(1),
(2) Date: Oct. 14, 2015

(87) PCT Pub. No.: WO2014/182233
PCT Pub. Date: Nov. 13, 2014

(65) Prior Publication Data
US 2016/0353511 A1    Dec. 1, 2016

Related U.S. Application Data

(60) Provisional application No. 61/820,767, filed on May 8, 2013.

(51) Int. Cl.
*H04W 4/00* (2018.01)
*H04W 76/02* (2009.01)
(Continued)

(52) U.S. Cl.
CPC ......... *H04W 76/028* (2013.01); *H04L 1/0018* (2013.01); *H04L 63/123* (2013.01);
(Continued)

(58) Field of Classification Search
CPC ............. H04W 76/028; H04W 76/046; H04W 28/0268; H04W 12/06; H04W 36/023; H04W 12/04; H04W 12/10; H04L 1/0018
See application file for complete search history.

(56) References Cited

U.S. PATENT DOCUMENTS

| 8,514,756 B1 * | 8/2013 | Ramachandra ..... H04W 76/002 370/310 |
| 2005/0177620 A1 | 8/2005 | Lee et al. |

(Continued)

FOREIGN PATENT DOCUMENTS

| EP | 2 357 873 A1 | 8/2011 |
| WO | WO 2008/024215 A2 | 2/2008 |

(Continued)

*Primary Examiner* — Clemence S Han
(74) *Attorney, Agent, or Firm* — Sage Patent Group

(57) ABSTRACT

The present disclosure relates to methods and arrangements for re-establishing packet data transfer between a radio base station and a wireless device following radio link failure, the radio base station having pre-configured wireless device information. The RBS receives a request for re-establishment of the radio link from the wireless device. One or more DRBs are selected for re-establishment based on the pre-configured wireless device information. The RBS transmits a radio link re-establishment response to the wireless device comprising information about the selected one or more DRBs. The selected one or more DRBs are re-established upon receipt of a re-establishment confirmation from the wireless device, whereupon packet data transfer is resumed.

35 Claims, 9 Drawing Sheets

(51) Int. Cl.
    *H04L 1/00*           (2006.01)
    *H04W 12/06*        (2009.01)
    *H04W 12/10*        (2009.01)
    *H04W 28/02*        (2009.01)
    *H04W 36/02*        (2009.01)
    *H04L 29/06*         (2006.01)
    *H04W 12/04*        (2009.01)

(52) U.S. Cl.
    CPC ........... *H04W 12/06* (2013.01); *H04W 12/10* (2013.01); *H04W 28/0268* (2013.01); *H04W 36/023* (2013.01); *H04W 76/19* (2018.02); *H04W 76/27* (2018.02); *H04W 12/04* (2013.01)

(56) References Cited

U.S. PATENT DOCUMENTS

| | | | | |
|---|---|---|---|---|
| 2009/0320100 | A1* | 12/2009 | Kitazoe | H04L 1/1607 726/3 |
| 2010/0080116 | A1* | 4/2010 | Agashe | H04W 36/08 370/216 |
| 2010/0246382 | A1* | 9/2010 | Yi | H04L 63/12 370/216 |
| 2011/0019532 | A1* | 1/2011 | Jung | H04W 76/028 370/216 |
| 2011/0143660 | A1* | 6/2011 | Iwamura | H04W 76/028 455/39 |
| 2011/0294508 | A1* | 12/2011 | Min | H04W 36/0083 455/436 |
| 2012/0233635 | A1* | 9/2012 | Hakola | H04W 12/02 725/25 |
| 2013/0044708 | A1* | 2/2013 | Kim | H04W 4/06 370/329 |
| 2013/0137469 | A1* | 5/2013 | Schmidt | H04W 74/006 455/466 |
| 2013/0150024 | A1* | 6/2013 | Burbidge | H04W 24/04 455/423 |
| 2013/0201924 | A1* | 8/2013 | Song | H04W 76/02 370/329 |
| 2014/0036685 | A1* | 2/2014 | Kim | H04W 48/20 370/236 |
| 2014/0126446 | A1* | 5/2014 | Deivasigamani | H04W 52/0216 370/311 |
| 2014/0243040 | A1* | 8/2014 | Bienas | H04W 36/30 455/552.1 |
| 2014/0269575 | A1* | 9/2014 | Zhang | H04W 76/025 370/329 |
| 2015/0373733 | A1* | 12/2015 | Bangolae | H04W 36/14 370/329 |
| 2016/0029417 | A1* | 1/2016 | Vannithamby | H04W 52/0209 455/422.1 |

FOREIGN PATENT DOCUMENTS

| | | |
|---|---|---|
| WO | WO 2008/116378 A1 | 10/2008 |
| WO | WO 2011/082822 A1 | 7/2011 |

* cited by examiner

PACKET DATA TRANSFER RE-ESTABLISHMENT

This application claims the benefit of US Provisional Application No. 61/820,767, filed May 7, 2014, the disclosure of which is fully incorporated herein by reference.

TECHNICAL FIELD

The present disclosure relates to methods and arrangements for quick re-establishment of packet data transfer upon radio link failure.

BACKGROUND

3GPP Long Term Evolution, LTE, is the fourth-generation mobile communication technologies standard developed within the 3rd Generation Partnership Project, 3GPP, to improve the Universal Mobile Telecommunication System, UMTS, standard to cope with future requirements in terms of improved services such as higher data rates, improved efficiency, and lowered costs. In a typical cellular radio system, wireless devices or terminals also known as mobile stations and/or user equipment units, UEs, communicate via a radio access network, RAN, to one or more core networks. The Universal Terrestrial Radio Access Network, UTRAN, is the radio access network of a UMTS and Evolved UTRAN, E-UTRAN, is the radio access network of an LTE system. The work of specifying the Evolved Universal Terrestrial Radio Access Network, E-UTRAN consisting of the Long Term Evolution, LTE, and System Architecture Evolution, SAE, concepts is currently ongoing within the 3rd Generation Partnership Project, 3GPP.

In an UTRAN and an E-UTRAN, a wireless device, also known as a User Equipment, UE, is wirelessly connected to a Radio Base Station, RBS. An RBS is a general term for a radio network node capable of transmitting radio signals to a wireless device and receiving signals transmitted by a wireless device. A logical node, commonly referred to as a NodeB, NB, in UMTS, and as an evolved NodeB, eNB or eNodeB, in LTE, is responsible for all radio-related functions in one or several cells. In the radio access network, control messages for connection setup, mobility and security are originating from the Radio Resource Control, RRC, located in the logical node, eNB, of a radio base station, RBS. In the following disclosure wireless device and UE will be used interchangeably to denote entities capable of wireless connection to a radio base station. Similarly, radio base station, RBS, and eNB will be used interchangeably to denote the access point to the radio access network.

The RRC is responsible for handling the radio access network-related procedures, including connection management, setting up bearers and mobility within the network. This includes establishing an RRC context, i.e. configuring the parameters necessary for communication between a wireless device and the radio access network, RAN.

In LTE a wireless device can be in two different states RRC_CONNECTED and RRC_IDLE. During the state RRC_IDLE, the wireless device does not belong to a specific cell. No data transfer takes place and the wireless device is inactive most of the time in order to maintain low power consumption. During the state RRC_CONNECTED, configuration information for the wireless device, i.e. the parameters necessary for communication between the wireless device and the radio access network, are known to both entities. Data transfer to/from the wireless device is possible only when there is an RRC connection during the state of RRC_CONNECTED.

In case of radio link failure, data transfer to/from a wireless device is disabled. Following radio link failure, there is a need for a quick recovery of the data transfer.

SUMMARY

It is an object of the present disclosure to provide embodiments solving the problem of quick recovery of data transfer upon radio link failure.

In particular, embodiments described herein disclose mechanisms to re-establish a subset or all radio bearers for data as part of a quick RRC connection reestablishment procedure. Thereby, the disconnection time can be shortened, which is critical for delay sensitive services.

The disclosure presents a method embodiment, performed in a radio base station, RBS, of re-establishing a data radio bearer, DRB, with a wireless device following radio link failure; the radio base station having pre-configured wireless device information. The method comprises receiving a request for re-establishment of the radio link from the wireless device. One or more DRBs are selected for re-establishment based on the pre-configured wireless device information. A radio link re-establishment response is transmitted to the wireless device, the response comprising information about the selected one or more DRB. A re-establishment confirmation is received from the wireless device, confirming re-establishment of the selected one or more DRBs.

Thus, in short, the method performed in the RBS comprises transmitting a message including an indication of one or more data radio bearers that can be re-established to a wireless device and receiving feedback from the wireless device upon a data radio bearer re-establishment completion. Thereby, the disconnection time can be shortened, which is critical for delay sensitive services. Furthermore, thanks to the provision of a mechanism that re-establishes a subset or all radio bearers, performance drops in cases where the handover fails are avoided and the connection is re-established within a short period of time at the target base station.

According to an aspect of the disclosure, the method comprises validating the requesting wireless device.

According to an aspect of the disclosure, the validating comprises validating the integrity of the re-establishment confirmation based on an integrity indication received in the confirmation.

According to an aspect of the disclosure, the validating comprises validating the integrity of the re-establishment request based on a message authentication code received in the request.

The step of validating and the specific measures suggested for performing such validating, decreases any security and integrity protection risks foreseeable when exchanging information on the DRBs in accordance with the disclosure. In particular, the step of validating provides for the same level of protection as in current security model.

According to an aspect of the disclosure, the request for re-establishment of the radio link is received on a signaling radio bearer.

According to an aspect of the disclosure, the received request for re-establishment of the radio link includes information on one or more data radio bearers preferred for re-establishment.

According to an aspect of the disclosure, the request for re-establishment of the radio link is received in an RRC Connection Reestablishment Request during a RRC connection re-establishment procedure.

According to another aspect of the disclosure, the reestablishment response comprising information to the wireless device on the selected one or more data radio bearers is transmitted on a signaling radio bearer.

According to an aspect of the disclosure, the DRB identity is included in an Information Element RadioResourceConfigDedicated/HO-toEUTRA.

According to an aspect of the disclosure, the confirmation from the wireless device is received in a RRC Connection Reestablishment Complete message.

According to an aspect of the disclosure, DRBs possible to re-establish without modifications are selected for re-establishment.

According to an aspect of the disclosure, DRBs are selected for re-establishment based on quality of service parameters of the DRBs.

According to an aspect of the disclosure, the quality of service parameters comprise latency.

According to an aspect of the disclosure, the information on the selected one or more DRBs includes DRB identity of each of the selected DRBs.

According to an aspect of the disclosure, information is received in a handover message from a source radio base station about one or more data radio bearers eligible for quick re-establishment According to an aspect of the disclosure, the information is received in a Handover Request message or in a Sequence Number, SN, status transfer.

According to an aspect of the disclosure, a security key is received in the radio base station; and the integrity of information transmitted to the wireless device on the selected one or more data radio bearers is protected based on the received security key.

According to an aspect of the disclosure, information for integrity verification is transmitted on a re-established signaling radio bearer.

The disclosure further presents a radio base station for reestablishing a data radio bearer, DRB, with a wireless device following radio link failure, the radio base station having pre-configured wireless device information. The radio base station comprises a processor, a communication interface, a memory and radio circuitry, said memory containing instructions executable by said processor. The processor is operative to receive a request for re-establishment of the radio link from the wireless device; to select one or more data radio bearers for re-establishment based on the pre-configured wireless device information; to transmit a radio link re-establishment response to the wireless device comprising information about the selected one or more DRBs; and to receive a re-establishment confirmation from the wireless device, confirming re-establishment of the selected one or more DRBs.

The radio circuitry, such as a transmitter and/or receiver, is configured to transmit a message including an indication of one or more data radio bearers that can be re-established to a wireless device and configured to receive feedback from the wireless device upon a data radio bearer re-establishment completion.

The disclosure also relates to a computer-readable storage medium, having stored thereon a computer program which when run in said radio base station, causes the radio base station to perform any of the above disclosed aspects of a method.

The radio base station, RBS, and the computer-readable storage medium each display advantages corresponding to the advantages already described in relation to the disclosure of the method performed in a radio base station.

The disclosure further presents a method embodiment, performed in a wireless device, of re-establishing a data radio bearer, DRB, following radio link failure, with a radio base station, RBS, having preconfigured wireless device information. In accordance with the method, a request for re-establishment of the radio link is transmitted to the RBS. The wireless device receives information on one or more data radio bearers selected for re-establishment, based on the pre-configured wireless device information. The selected one or more DRBs are re-established and a re-establishment confirmation is sent to the radio base station RBS.

In brief, the method performed in the wireless device comprises receiving an indication in a message from a network node, e.g. a radio base station, RBS, information on one or more data radio bearers that can be re-established; and, re-establishing all or a subset of the indicated data radio bearers.

The method performed in a wireless device displays advantages corresponding to the advantages already described in relation to the disclosure of the method performed in a radio base station.

The disclosure also presents a wireless device, for re-establishing a data radio bearer, DRB, following radio link failure, with a radio base station, RBS, having preconfigured wireless device information, the wireless device comprising a processor, a memory and radio circuitry, said memory containing instructions executable by said processor, whereby said wireless device is operative to transmit a request for re-establishment of the radio link to the RBS; to receive information on one or more data radio bearers selected for re-establishment, based on the pre-configured wireless device information; to re-establish the selected one or more DRBs; and to transmit a re-establishment confirmation to the radio base station RBS.

The radio circuitry, such as a receiver, is configured to receive a message from a network node, e.g. a radio base station, RBS, which message indicates one or more data radio bearers that can be re-established. A processing unit/processor of the wireless device is configured to re-establish all or a subset of the indicated data radio bearers.

The disclosure further relates to a computer-readable storage medium, having stored thereon a computer program which when run in the wireless device, causes the wireless device to perform any of the above disclosed aspects of a method.

The disclosure further relates to a radio base station, RBS, for re-establishing a data radio bearer, DRB, with a wireless device, following radio link failure, the radio base station comprising radio circuitry configured to receive a request for re-establishment of the radio link from a wireless device. The radio base station further comprises a processor including preconfigured wireless device information and configured to select one or more DRBs for reestablishment based on the preconfigured wireless device information. The radio circuitry is further configured to transmit a radio link re-establishment response to the wireless device, the reestablishment response comprising information about the selected one or more DRBs, and to receive a reestablishment confirmation from the wireless device, confirming re-establishment of the selected one or more DRBs.

The disclosure further relates to a wireless device for reestablishing a data radio bearer, DRB, following radio link failure, with a radio base station, RBS. The wireless device comprises a radio circuitry configured to transmit a request for reestablishment of the radio link to the RBS and to receive a radio link reestablishment response from the RBS, the reestablishment response including information about one or more data radio bearers selected or reestablishment. The wireless device further comprises a processor configured to reestablish the selected one or more DRBs. The radio circuitry is further configured to transmit a re-establishment confirmation to the RBS.

The wireless device and the computer-readable storage medium each display advantages corresponding to the advantages already described in relation to the disclosure of the method performed in a wireless device.

BRIEF DESCRIPTION OF THE DRAWINGS

Further objects, features and advantages of the present disclosure will appear from the following detailed description, wherein some aspects of the disclosure will be described in more detail with reference to the accompanying drawings, in which:

FIG. 4 a) is a signaling diagram illustrating a signaling flow for Radio Resource Control, RRC, connection reestablishment including quick DRB reestablishment following radio link failure;

Figure 5:
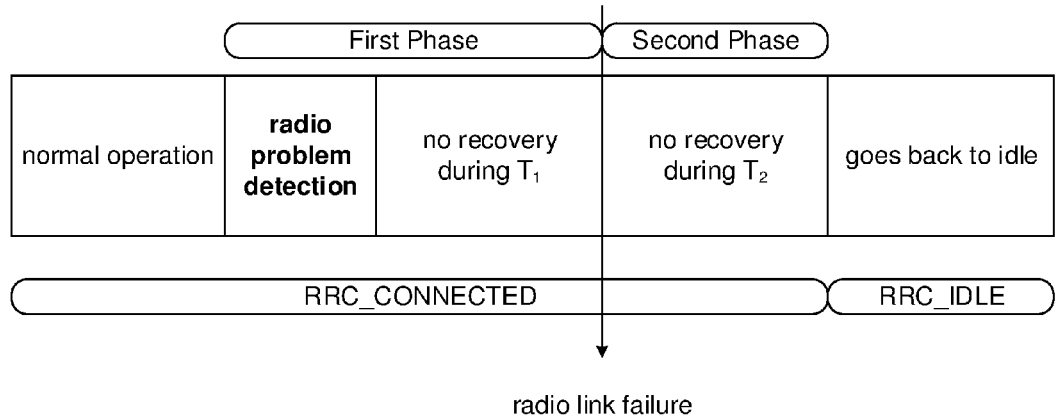

b) is a signaling diagram illustrating a signaling flow for RRC connection reestablishment including quick DRB reestablishment following handover failure;

FIG. 5 illustrates radio link failure

Figure 7:
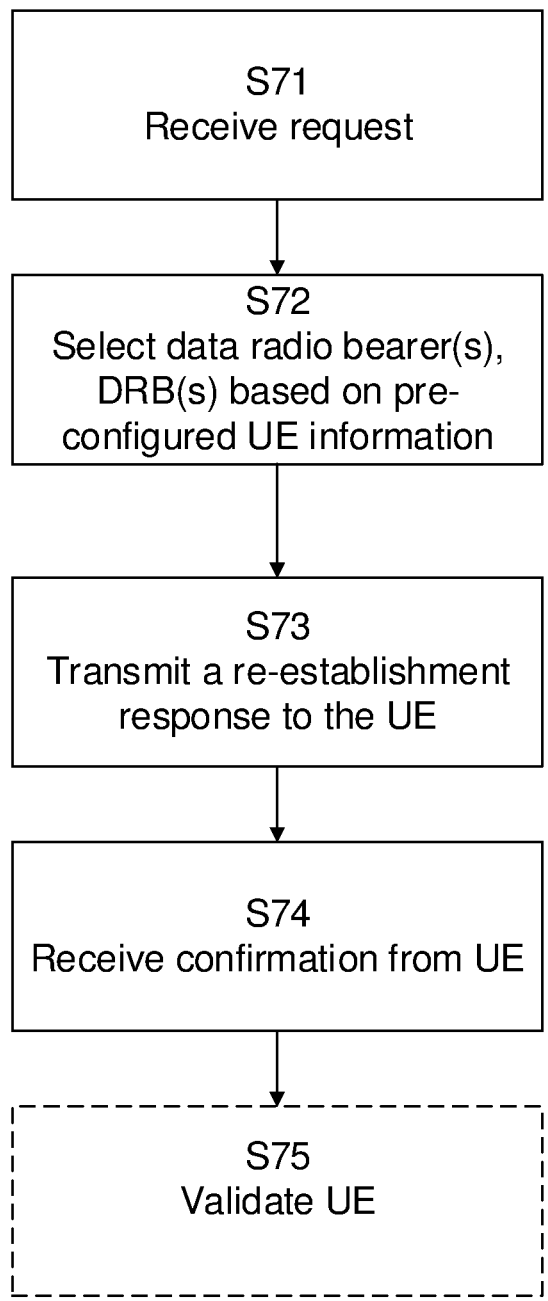
Figure 8:
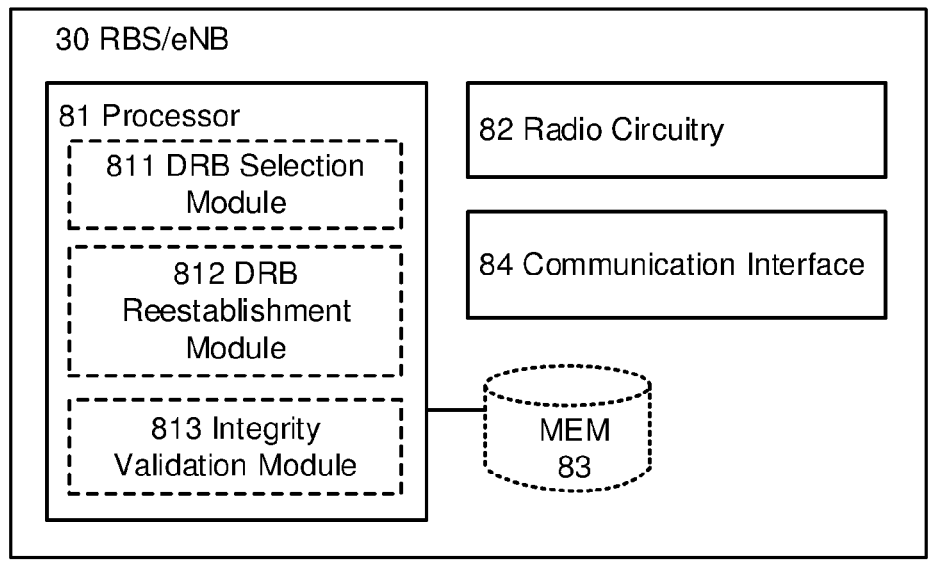
Figure 10:
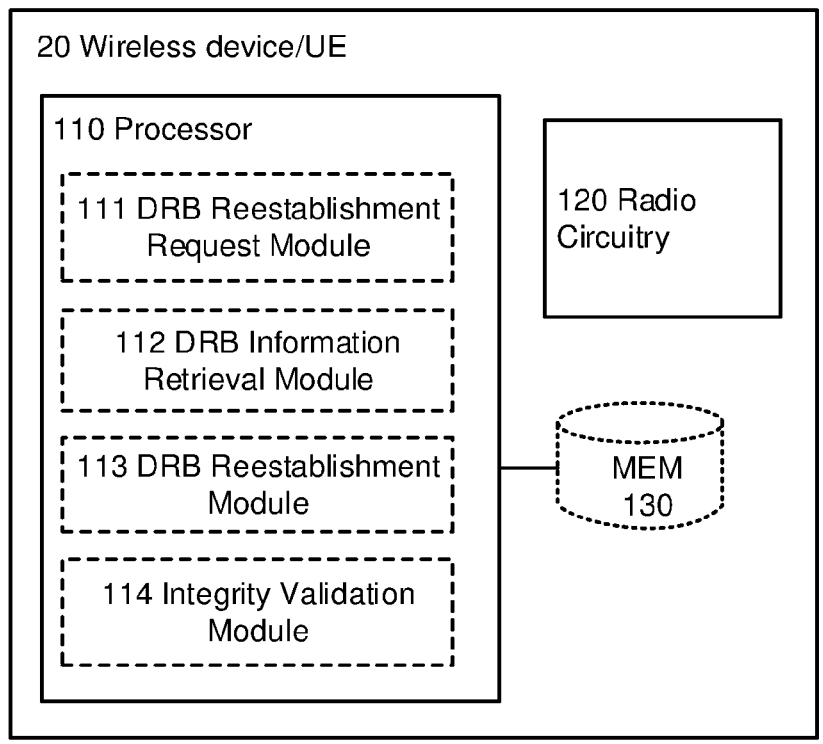
Figure 9:
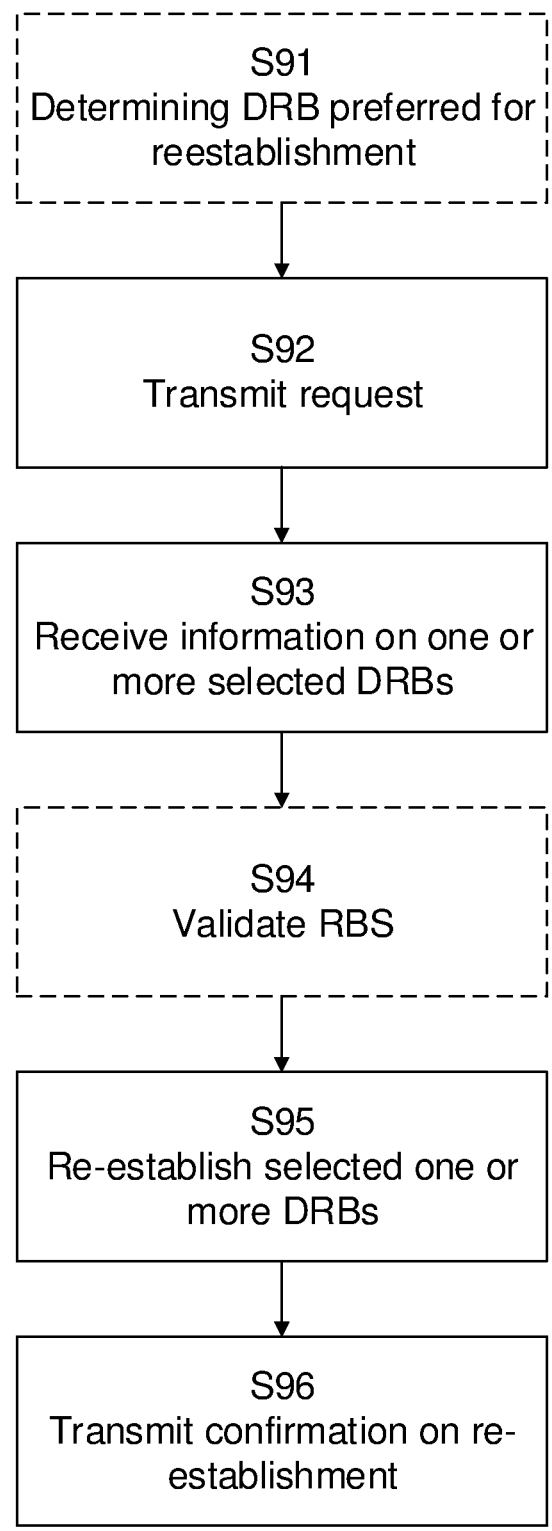

FIG. 6 a) discloses computation of Message Authentication Codes, MACs in an LTE sender b) discloses computation of Message Authentication Codes, MACs in an LTE receiver FIG. 7 is a flowchart illustrating embodiments of method steps performed in a radio base station;

FIG. 8 is a block diagram illustrating an embodiment of a radio base station;

FIG. 9 is a flowchart illustrating embodiments of method steps performed in a wireless device;

FIG. 10 is a block diagram illustrating an embodiment of a wireless device user equipment.

ABBREVIATIONS

3GPP 3rd Generation Partnership Project
ABS Almost Blank Subframes
ARQ Automatic Repeat Request
AS Access Stratum
BS Base Station
C-RNTI Cell Radio Network Temporary Identifier
DCCH Dedicated Control Channel
DL Downlink
DRB Data Radio Bearer
EPC Evolved Packet Core
EPS Evolved Packet System
E-RAB E-UTRAN Radio Access Bearer
E-UTRAN Evolved Universal Terrestrial Radio Access Network
HARQ Hybrid ARQ
HO Hand Over
LTE Long Term Evolution
MAC Medium Access Control
MCS Modulation and Coding Scheme
MIB Master Information Block
MME Medium Access Control
NAS Non-Access Stratum
NCP Normal Cyclic Prefix
PCI Physical Cell Identifier
PDCP Packet Data Convergence Protocol
PSS Primary Synchronization Signal
QoS Quality of Service
RACH Random Access Channel
RB Radio Bearer
RAN Radio Access Network
RBS Radio Base Station
RNC Radio Network Control
RNL Radio Network Layer
RRC Radio Resource Control
RRM Radio Resource Management
SAE System Architecture Evolution
SDU Service Data Unit
SGW Service Gateway
SIB System Information Block
SRB Signaling Radio Bearer
SGW Serving Gateway
SSS Secondary Synchronization Signal
TA Tracking Area
TNL Transport Network Layer
UE User Equipment
UL Uplink
WCDMA Wideband CDMA

DETAILED DESCRIPTION

The general object or idea of embodiments of the present disclosure is to address at least one or some of the disadvantages with the prior art solutions described above as well as below. The various steps described below in connection with the figures should be primarily understood in a logical sense, while each step may involve the communication of one or more specific messages depending on the implementation and protocols used.

Embodiments of the present disclosure relate, in general, to the field of re-establishing packet data transfer following radio link failure. In particular, the disclosure relates to embodiments for re-establishing a subset or all radio bearers for data as part of the RRC connection re-establishment procedure. Thereby, the disconnection time can be shorted, which is critical for delay sensitive services.

The disclosed mechanism applies to general cells served by general base stations, but is also applicable to cell deployments comprising a heterogeneous cells and multi-cell coordination, e.g. including macro and Pico eNBs. The disclosed mechanism is also possible to deploy in WCDMA, implemented in the Radio Network Control, RNC. Deployed in WCDMA, the RNC could consider forwarding packets to a NodeB where a wireless device is re-establishing a connection, and thereby quickly re-establish an RRC connection.

Figure 1:
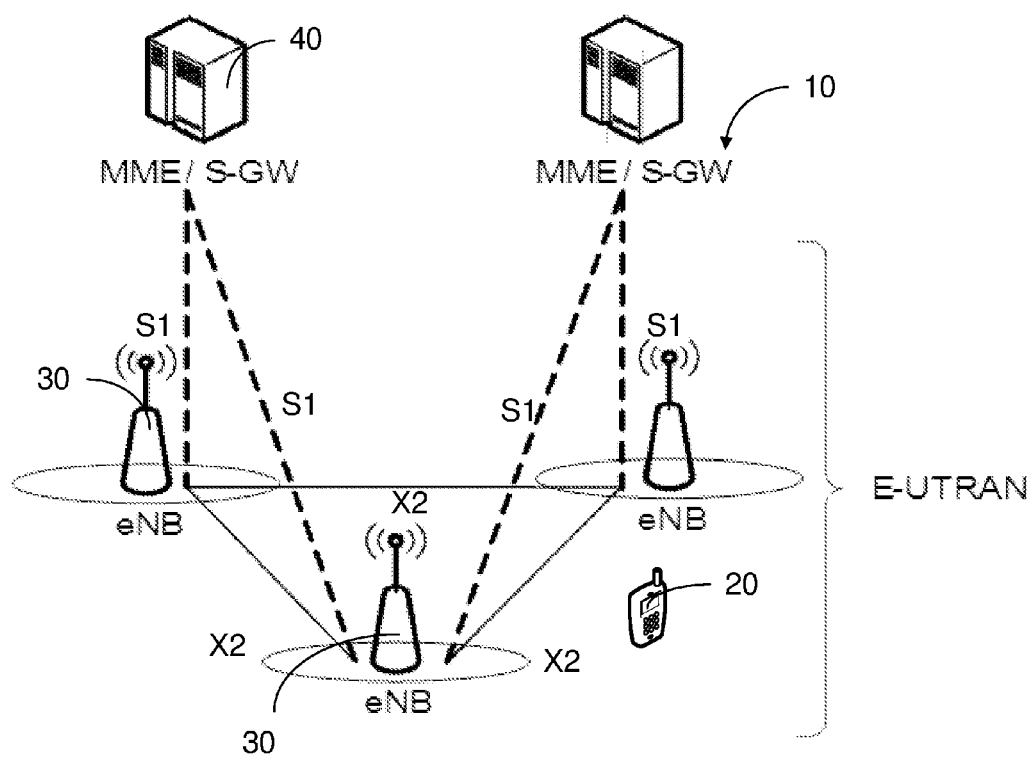
FIG. 1 is an LTE system overview.

FIG. 1 schematically illustrates a basic LTE, Long Term Evolution, network 10, including radio base stations, RBS 30, arranged for communicating with wireless devices 20 over a wireless communication interface. The plurality of RBSs 30, here shown as eNBs, is connected to Medium Access Control, MME/Serving Gateway, SGW 40 entities via S1 interfaces. The eNBs are connected to each other via X2 interfaces.

Figure 2:
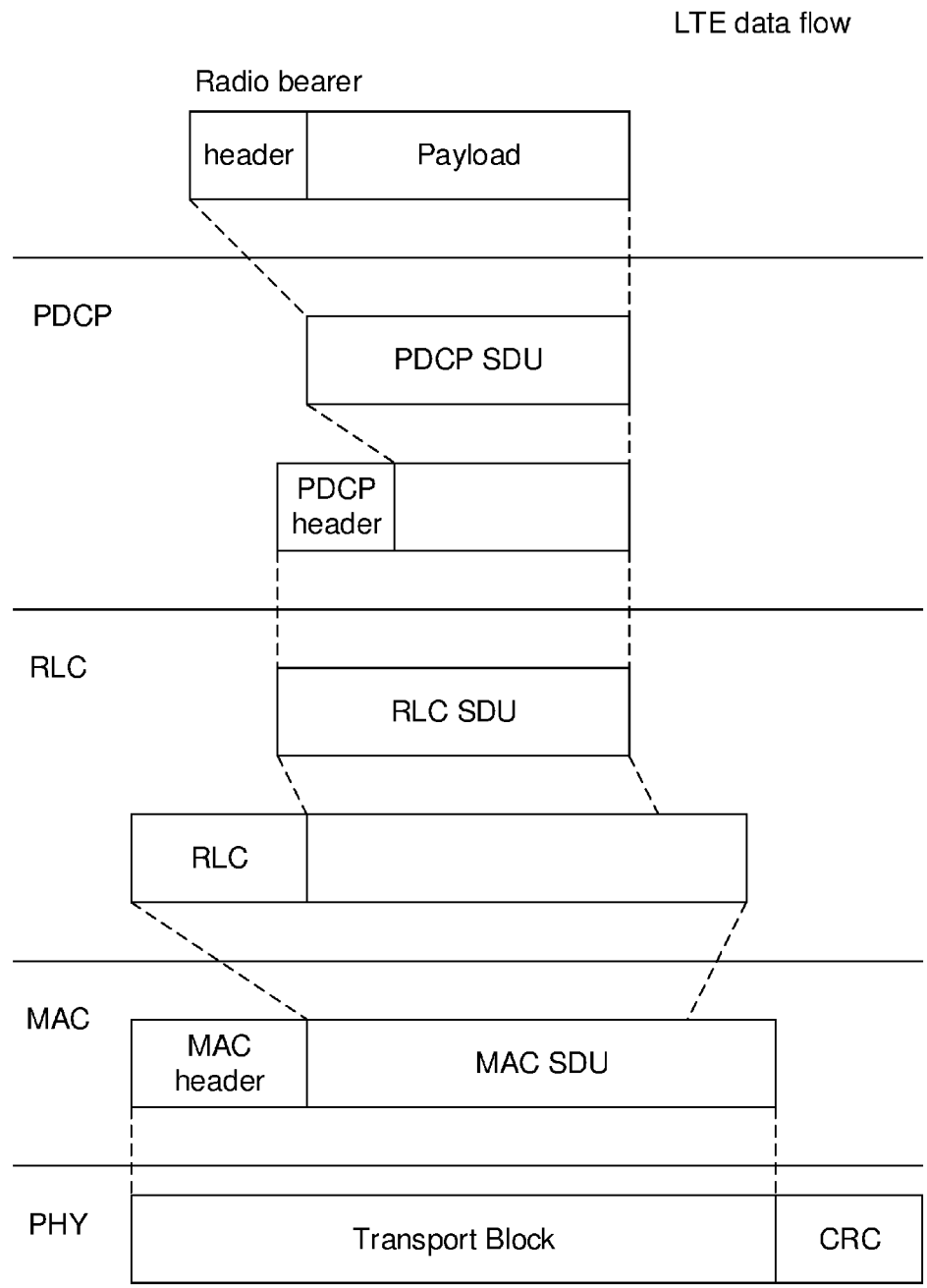
FIG. 2 discloses an example of LTE data flow.

FIG. 2 discloses an example of a flow of down link, DL, data through the protocol layers of the LTE network architecture. The illustration reflects the case of one radio bearer, RB, for an IP packet. The protocol layers and data flow for uplink transmission is similar. The IP-packet is mapped to the radio bearer. The LTE radio-access network provides one or more radio bearers to which internet protocol, IP, packets are mapped according to their quality of service requirements. The context of radio bearers, RBs, include Signaling Radio Bearers, SRBs, and Data Radio Bearers, DRBs. Signaling Radio Bearers, SRBs, are defined as Radio Bearers, RBs, that are used only for the transmission of Radio Resource Control, RRC, and Non-Access Stratum, NAS, messages. More specifically, in LTE, three SRBs SRB0-SRB2 are defined wherein SRB0 is for RRC messages using a Common Control Channel, CCCH, logical channel; SRB1 is for RRC messages as well as for NAS messages prior to the establishment of SRB2, all using a Dedicated Control Channel DCCH logical channel; and SRB2 is for RRC messages which include logged measurement information as well as for NAS messages, all using DCCH logical channel. SRB2 has a lower-priority than SRB1 and is configured by E-UTRAN after security activation. Data Radio Bearers, DRBs, are used for data packet transfer, i.e. transmission or reception, to/from the wireless device. Consequently, to enable data packet transfer between a wireless device and a radio base station, SRBs as well as DRBs must be established between the wireless device and the radio base station that the wireless device is connected to.

In LTE a wireless device can be in two different states RRC_CONNECTED and RRC_IDLE. During the state RRC_IDLE, the wireless device does not belong to a specific cell. No data transfer takes place and the wireless device is inactive most of the time in order to maintain low power consumption. During the state RRC_CONNECTED, configuration information for the wireless device, i.e. the parameters necessary for communication between the wireless device and the radio access network, are known to both entities. Data transfer to/from the wireless device is possible only when there is an RRC connection during the state of RRC_CONNECTED.

In case of radio link failure, an RRC connection re-establishment procedure will be initiated with mechanisms to associate the wireless device to its wireless device context in the RBS if the wireless device is re-establishing the connection to the same RBS as prior to failure, or to a prepared base station, which means that the UE context has been transferred. In accordance with a state of the art solution for re-establishment, the procedure ends with the successful re-establishment of one or more signaling radio bearers, e.g. SRB1. However, data packet transfer to/from the wireless device requires the re-establishment of radio bearers. Such radio bearers are traditionally established during an RRC Connection Reconfiguration procedure; thereby delaying connection establishment and the ability to resume data transmission upon radio link failure.

Figure 3:
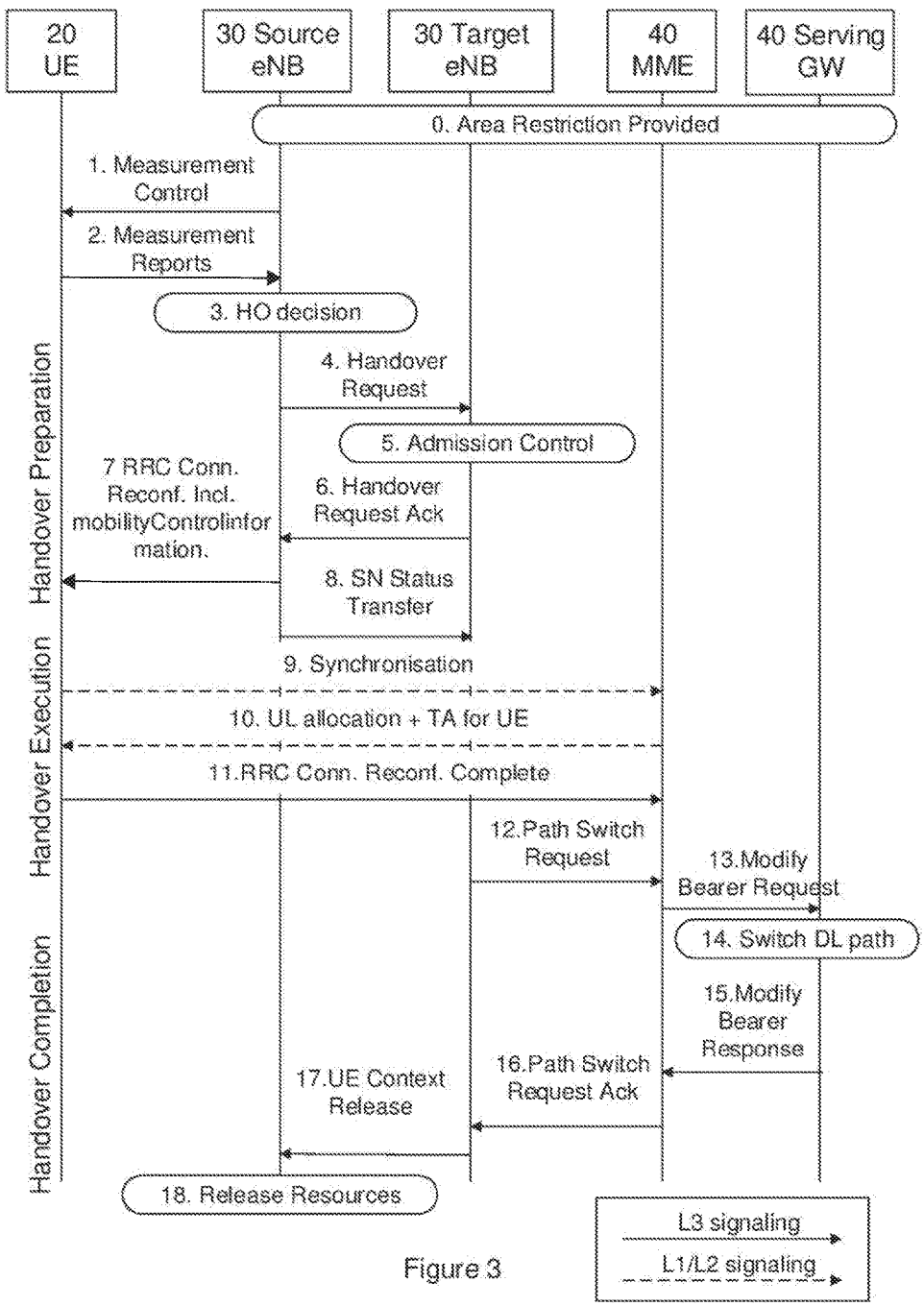
FIG. 3 is a signaling diagram illustrating state of the art signaling during intra-LTE, inter-eNB handover.

FIG. 3 discloses an intra-LTE handover principle in case of inter-eNB, intra MME/SGW handover in accordance with 3GPP TS 36.300 v.9.10.0. Here, the term UE will be used to denominate a wireless device served by an RBS, here presented as an eNB.

0 The UE context within the source eNB comprises information regarding roaming restrictions which were provided either at connection establishment or at the last Timing Advance, TA, update.

1 The source eNB configures the UE measurement procedures according to the area restriction information. Measurements provided by the source eNB may assist the function controlling the UE's connection mobility.

2 The UE is triggered to send MEASUREMENT REPORT by the rules set by e.g., system information, specification etc.

3 The source eNB makes decision based on MEASUREMENT REPORT and RRM information to hand off/hand over, HO, the UE.

Handover Preparation

4 The source eNB issues a HANDOVER REQUEST message to the target eNB passing necessary information to prepare the HO at the target side (UE X2 signaling context reference at source eNB, UE S1 EPC signaling context reference, target cell ID, $K_{eNB}$, RRC context including the Cell Radio Network Temporary Identifier, C-RNTI, of the UE in the source eNB, AS-configuration, E-RAB context and physical layer ID of the source cell+short MAC-I for possible RLF recovery). UE X2/UE S1 signaling references enable the target eNB to address the source eNB and the EPC. The E-RAB context includes necessary RNL and TNL addressing information, and QoS profiles of the E-RABs.

5 Admission Control may be performed by the target eNB dependent on the received E-RAB Quality of Service, QoS, information to increase the likelihood of a successful HO, if the resources can be granted by target eNB. The target eNB configures the required resources according to the received E-RAB QoS information and reserves a Cell Radio Network Temporary Identifier, C-RNTI, and optionally a, Random Access Channel, RACH preamble. The AS-configuration to be used in the target cell can either be specified independently (i.e. an "establishment") or as a delta compared to the AS-configuration used in the source cell (i.e. a "reconfiguration").

6 The target eNB prepares HO with L1/L2 and sends the HANDOVER REQUEST ACKNOWLEDGE to the source eNB. The HANDOVER REQUEST ACKNOWLEDGE message includes a transparent container to be sent to the UE as an RRC message to perform the handover. The container includes a new C-RNTI, target eNB security algorithm identifiers for the selected security algorithms, may include a dedicated RACH preamble, and possibly some other parameters i.e. access parameters, SIBs, etc. The HANDOVER REQUEST ACKNOWLEDGE message may also include RNL/TNL information for the forwarding tunnels, if necessary.

As soon as the source eNB receives the HANDOVER REQUEST ACKNOWLEDGE, or as soon as the transmission of the handover command is initiated in the downlink, data forwarding may be initiated.

Handover Execution

Steps 7 to 16 below provide means to avoid data loss during HO and are further detailed in sub-clauses 10.1.2.1.2 and 10.1.2.3 of 3GPP TS 36.300, v.9.10.0.

7 The target eNB generates the RRC message to perform the handover, i.e. RRCConnectionReconfiguration message including the mobilityControlInformation, to be sent by the source eNB towards the UE. The source eNB performs the necessary integrity protection and ciphering of the message. The UE receives the RRCConnectionReconfiguration message with necessary parameters (e.g., new C-RNTI, target eNB security algorithm identifiers, and optionally dedicated RACH preamble, target eNB SIBs, etc.) and is commanded by the source eNB to perform the HO. The UE does not need to delay the handover execution for delivering the HARQ/ARQ responses to source eNB.

8 The source eNB sends the SN STATUS TRANSFER message to the target eNB to convey the uplink PDCP SN receiver status and the downlink PDCP SN transmitter status of E-RABs for which PDCP status preservation applies (i.e.

for RLC AM). The uplink PDCP SN receiver status includes at least the PDCP SN of the first missing UL SDU and may include a bit map of the receive status of the out of sequence UL SDUs that the UE needs to retransmit in the target cell, if there are any such SDUs. The downlink PDCP SN transmitter status indicates the next PDCP SN that the target eNB shall assign to new SDUs, not having a PDCP SN yet. The source eNB may omit sending this message if none of the E-RABs of the UE shall be treated with PDCP status preservation.

9 After receiving the RRCConnectionReconfiguration message including the mobilityControlInformation, UE performs synchronization to target eNB and accesses the target cell via RACH, following a contention-free procedure if a dedicated RACH preamble was indicated in the mobilityControlInformation, or following a contention-based procedure if no dedicated preamble was indicated. UE derives target eNB specific keys and configures the selected security algorithms to be used in the target cell.

10 The target eNB responds with UL allocation and timing advance.

11 When the UE has successfully accessed the target cell, the UE sends the RRCConnectionReconfigurationComplete message (C-RNTI) to confirm the handover, along with an uplink Buffer Status Report, whenever possible, to the target eNB to indicate that the handover procedure is completed for the UE. The target eNB verifies the C-RNTI sent in the RRCConnectionReconfigurationComplete message. The target eNB can now begin sending data to the UE.

Handover Completion

12 The target eNB sends a PATH SWITCH REQUEST message to MME to inform that the UE has changed cell.

13 The MME sends a MODIFY BEARER REQUEST message to the Serving Gateway.

14 The Serving Gateway switches the downlink data path to the target side. The Serving gateway sends one or more "end marker" packets on the old path to the source eNB and then can release any U-plane/TNL resources towards the source eNB.

15 The Serving Gateway sends a MODIFY BEARER RESPONSE message to MME.

16 The MME confirms the PATH SWITCH REQUEST message with the PATH SWITCH REQUEST ACKNOWLEDGE message.

17 By sending the UE CONTEXT RELEASE message, the target eNB informs success of HO to source eNB and triggers the release of resources by the source eNB. The target eNB sends this message after the PATH SWITCH REQUEST ACKNOWLEDGE message is received from the MME.

18 Upon reception of the UE CONTEXT RELEASE message, the source eNB can release radio and C-plane related resources associated to the UE context. Any ongoing data forwarding may continue.

In addition, the user plane procedures to avoid data loss during HO are also captured by FIG. 2:

During HO preparation tunnels for forwarding data from source to target can be established between the source eNB and the target eNB; one tunnel for uplink data forwarding and another one for downlink data forwarding for each E-RAB for which data forwarding is applied.

During HO execution, user data can be forwarded from the source eNB to the target eNB. The forwarding may take place in a service and deployment dependent and implementation specific way.

Forwarding of downlink user data from the source eNB to the target eNB should take place in order as long as packets are received at the source eNB from the EPC or the source eNB buffer has not been emptied.

During HO completion the target eNB sends a PATH SWITCH message to MME to inform that the UE has gained access and MME sends a MODIFY BEARER REQUEST message to the Serving Gateway, the U-plane path is switched by the Serving Gateway from the source eNB to the target eNB.

The source eNB should continue forwarding of U-plane data as long as packets are received at the source eNB from the Serving Gateway or the source eNB buffer has not been emptied.

As mentioned previously, the RRC connection re-establishment procedure is initialized when the wireless device detects any of the following: radio link failure, handover failure, mobility from E-UTRA failure, integrity check failure indication from lower layers, or an RRC connection reconfiguration failure. The procedure is only initialized following activation of access stratum security.

When the wireless device initiates the RRC connection re-establishment procedure, the wireless device is arranged to suspend all RBs except SRB0; reset MAC and release any SCell(s), if configured. Furthermore, the wireless device applies the default physical channel configuration, applies the default semi-persistent scheduling configuration and applies the default MAC main configuration. The cell selection is performed in accordance with the cell selection process as specified in TS 36.304 v.9.11.0.

Figure 4A:
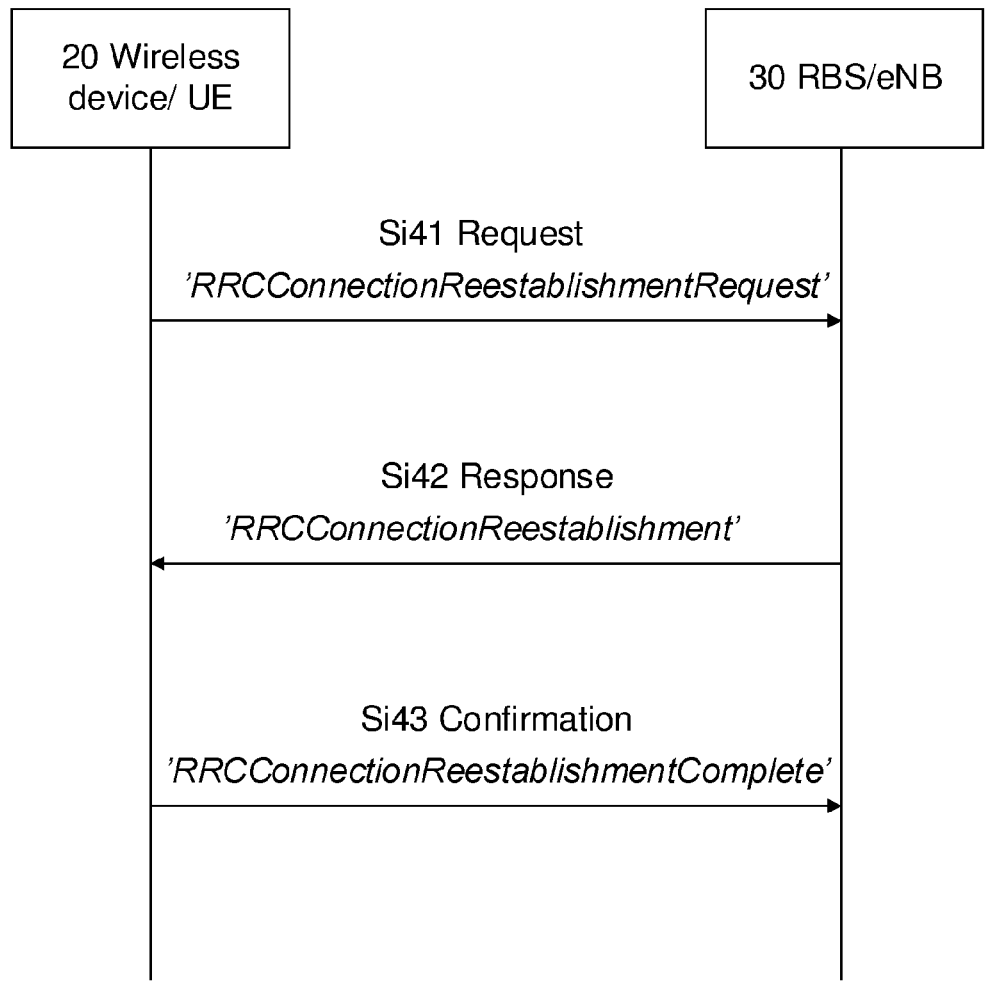

Turning to FIG. 4a, a schematic signaling diagram is disclosed representing a signaling flow for RRC connection reestablishment following radio link failure. The re-establishment procedure is initiated upon receipt of a request message Si41 RRCConnectionReestablishmentRequest, from the wireless device/UE in the RBS/eNB.

The request message RRCConnectionReestablishmentRequest includes the following information:

C-RNTI: The UE identity that the UE was allocated by the last primary serving cell the UE was connected to prior to the failure Physical cell identity: The Physical Cell Identity (1 out of 504) of primary serving cell, PCell, the UE was connected to prior to the failure.

ShortMac-I: UE specific information based on security configuration allocated by the primary cell the UE was connected to prior to the failure. Also cell identity of current cell, PCI and C-RNTI used by the primary cell the UE was connected to prior to the failure is input to ShortMac-I calculations.

The UE receives a response message Si42 RRCConnectionReestablishment, from the eNB. Upon receipt of the response message RRCConnectionReestablishment the UE considers the current cell to be the PCell. Further, the UE re-establishes the Packet Data Convergence Protocol, PDCP, and Radio Link Control, RLC, for SRB1. A radio resource configuration procedure is performed in accordance with a received radioResourceConfigDedicated information element of the response message Si42. Re-establishment of the signaling radio bearer, SRB1, is completed when a confirmation message Si43 RRCConnectionReestablishmentComplete is received from the UE in the eNB. Prior to receiving the feedback message, the messages are exchanged on a signaling radio bearer, SRB0.

FIG. 5 illustrates radio link failure. As illustrated in FIG. 5, the radio link failure can be considered to include two phases governing the behavior associated to radio link failure. The radio link failure occurs for a wireless device whilst being in the state of RRC_CONNECTED. The first phase occurs when a radio problem is detected during normal operation. Following detection of the radio problem and a recovery period during which no recovery occurs, the recovery period e.g. based on timer or other criteria, radio link failure is detected. During the second phase, starting at radio link failure detection or handover failure, a further recovery period precedes the transition to the RRC_IDLE state for the UE. Thus, during the first phase, there is no UE mobility and the UE remains connected to the same cell. During the second phase, there is UE-based mobility when a UE is capable of selecting a different cell. Table 1 below discloses how mobility is handled with respect to radio link failure.

TABLE 1

| Cases | First Phase | Second Phase | T2 expired |
|---|---|---|---|
| UE returns to the same cell | Continue as if no radio problems occurred | Activity is resumed by means of explicit signalling between UE and eNB | Go via RRC_IDLE |
| UE selects a different cell from the same eNB | N/A | Activity is resumed by means of explicit signalling between UE and eNB | Go via RRC_IDLE |
| UE selects a cell of a prepared eNB (NOTE) | N/A | Activity is resumed by means of explicit signalling between UE and eNB | Go via RRC_IDLE |
| UE selects a cell of a different eNB that is not prepared (NOTE) | N/A | Go via RRC_IDLE | Go via RRC_IDLE |

(NOTE):
a prepared eNB is an eNB which has admitted the UE during an earlier executed HO preparation phase.

Figure 6A:
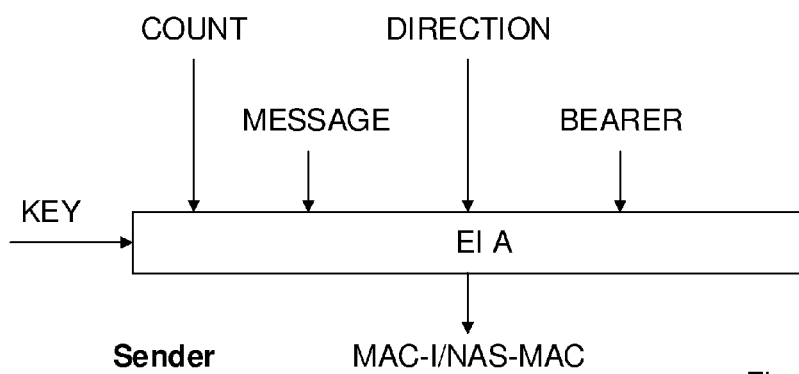
Figure 6B:
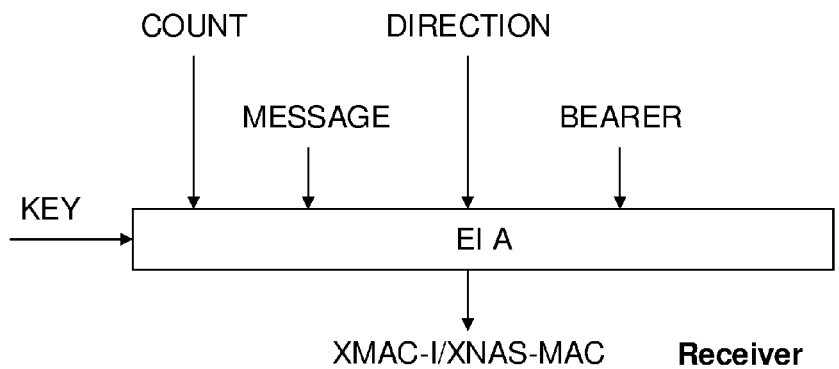

In the Second Phase, in order to resume activity and avoid going via RRC_IDLE when the UE returns to the same cell or when the UE selects a different cell from the same eNB, or when the UE selects a cell from a different eNB prepared for handover, i.e. having a UE context, the following procedure applies:
  The UE stays in RRC_CONNECTED;
  The UE accesses the cell through the random access procedure;
  The UE identifier used in the random access procedure for contention resolution (i.e. C RNTI of the UE in the cell where the RLF occurred+physical layer identity of that cell+short MAC-I based on the keys of that cell) is used by the selected eNB to authenticate the UE and check whether it has a context stored for that UE:
    If the eNB finds a context that matches the identity of the UE, it indicates to the UE that its connection can be resumed;
    If the context is not found, RRC connection is released and UE initiates procedure to establish new RRC connection. In this case UE is required to go via RRC_IDLE.
FIGS. 6a and b illustrate computation of Message Authentication Codes, MACs, in LTE. The integrity protection algorithm used is called Evolve Packet System, EPS, Integrity Algorithm, EIA. The algorithms can be instantiated by several concrete algorithms as defined in T533.401, v.9.7.0. The currently specified algorithms are:
  EIA0 no integrity protection, only for use with unauthenticated emergency calls
  EOA1 based on the SNOW3G core
  EIA2 based on the AES core
  EIA3 based on a ZUC core.
The input and output parameters are the same for any concrete instantiation of EIA and is defined in Annex B.2 of TS33.401 v.9.7.0, as illustrated for the sender side in FIG. 6a and for the receiver side in FIG. 6b.

In case of radio link failure that initialize the RRC connection re-establishment procedure, there are thus mechanisms to associate the UE to its UE context if the UE is re-establishing the connection to the same base station as before the failure, or to a prepared base station, i.e. a radio base station to which the UE context has been transferred during handover preparation.

Based on the reestablishment procedures discussed above, the disclosure further improves reestablishment by enabling a quick RRC connection reestablishment procedure including a subset or all radio bearers for data.

FIG. 7 illustrates the network side of a method of re-establishing a data radio bearer, DRB, between a radio base station and a wireless device, such as an eNB 30 and a wireless device/UE 20 illustrated in FIG. 1. On the network side, the re-establishment procedure is initiated when a serving RBS receives S71 a request for reestablishment of a radio link. According to an aspect of the disclosure, such a request could be considered in the context of the signaling diagram illustrated in FIG. 4a and for the reestablishment procedure. Thus, transmission/receipt of a request Si41 RRCConnectionReestablishmentRequest represents one possibility to initiate the quick RRC connection reestablishment. Radio link failure occurs for an established radio link connection. Consequently, the radio base station performing the illustrated method has information on UE context, i.e. preconfigured information on the wireless device, either from a previous connection or from a handover preparation procedure The radio base station selects S72 one or more DRBs for re-establishment based on the pre-configured wireless device information, the UE context in the RBS. According to an aspect of the disclosure, a target RBS/eNB to which the DRBs are to be reestablished selects DRBs subject to quick re-establishment based on quality of service parameters of the DRBs. For example, DRBs subject to latency requirements could be subject to quick re-establishment.

A radio link reestablishment response message Si42 is transmitted S73 to the wireless device from the target RBS/eNB, the response comprising information about the selected one or more DRBs, e.g. one or more of the DRBs previously indicated in the request message sent from the wireless device.

The reestablishment of the selected one or more DRBs is completed in the RBS upon receiving S74 the re-establishment confirmation from the wireless device. The confirmation message, e.g. an RRCConnectionReestablishmentComplete message, is an indication that from the wireless device that the corresponding DRBs have also been established. Thus, following receipt of the re-establishment confirmation, DRBs for data packet forwarding are reestablished between the wireless device and a radio base station that the wireless device is connected to. The DRBs are provided as part of the reestablishment procedure, thereby enabling full recovery of radio bearers in a reestablishment procedure.

According to an aspect of the disclosure, an optional step S75 of validating the wireless device is performed.

According to an aspect of the disclosure, validating S75 of the wireless device is performed by validating the integrity of the re-establishment confirmation based on an integrity indication received in the confirmation from the UE.

According to another aspect of the disclosure, validating S75 of the wireless device is performed by validating the integrity of the re-establishment request, received in step S71, based on a message authentication code received in the request. The wireless device computes a Message Authentication Code, MAC, over the UL_DRB_INFO and includes the MAC in the re-establishment request Si41, e.g. an RRCConnectionReestablishmentRequest message. The MAC requires a key K. How the key K is derived is further discussed below. The eNB verifies that the MAC included in the message is correct. This ensures the integrity of the UL_DRB_INFO. If the eNB detects that the MAC does not verify, the eNB can reject the re-establishment attempt from the UE. The eNB then computes a MAC over the DL_DRB_INFO and includes that MAC in the response Si42, e.g. an RRCConnectionReestablishment message. The wireless device can then verify the MAC in order to verify the integrity.

According to another option, the UE includes the UL_DRB_INFO without adding a MAC. The eNB then calculates a MAC over both the UL_DBR_INFO and the DL_DRB_INFO and includes that MAC in the response Si42, RRCConnectionReestablishment message, together with the DL_DRB_INFO. Since the UE now has access to both DL_DRB_INFO and UL_DRB_INFO, the UE can verify the received MAC and verify the integrity of both pieces of information. The UE can the chose to, e.g., send a re-establishment reject message in case there is a received MAC does not verify.

The MACs above need a key K. This key could be the $K_{eNB}$ that is established during the re-establishment procedure. Another option is to use a key derived from the $K_{eNB}$ for this particular purpose, e.g., a key called $K_{re-establish}$ calculated as a Key Derivation Function (KDF) applied to the $K_{eNB}$ that is established during the re-establishment procedure. It could be calculated as $K_{re-establish}=KDF(K_{eNB}, \text{other params})$, where other params is zero or more other parameters, for example the cell identifier, the C-RNTI or something else. Another option is to use the integrity protection key used by the PDCP layer, the $K_{RRC-int}$ which is derived from the $K_{eNB}$. It is also possible that the source eNB derives a key for use in these MAC calculations and provide that to the target eNB in the Handover Request Si45, as disclosed in FIG. 4b. The source eNB could derive the key from the $K_{eNB}$ used in the source cell, or the $K_{RRC-int}$ used in the source cell, or from the short-MAC-I prepared for the target cell. The wireless device must be able to derive the key that will be used for the MAC calculations.

In order to provide an acceptable security level, the disclosure proposes validating S75 the requesting wireless device upon receipt S74 of the confirmation. The wireless device includes both the UL_DRB_INFO and the DL_DRB_INFO also in the RRCConnectionReestablishmentComplete message. This message is sent over an integrity protected Signaling Radio Bearer, e.g. SRB1. When the eNB receives the message, the eNB can verify two things. First, that the UL_DRB_INFO is the same as the eNB received in the unprotected RRCConnectionReestablishmentRequest message and secondly, if the DL_DRB_INFO is the same as the eNB itself sent in the RRCConnectionReestablishment message. If both these checks are successful, the eNB can conclude that the data in the first two messages were not modified by an attacker. If the checks fail, the eNB could deduce that the data in the first two messages was somehow modified and the eNB could for example release the RRC connection.

In one particular embodiment, the target eNB includes information in the RRC Connection Reestablishment message about the data radio bearers that shall be re-established without modifications. This is referred to as quick DRB re-establishment. One example of such information is the DRB Identity of each DRB that shall be re-established. One restriction for quick DRB re-establishment could be that such DRBs can only be re-established, but not reconfigured.

FIG. 9 illustrates the method from the side of the wireless device. The reestablishment procedure is initiated following detection of radio link failure. According to an aspect of the disclosure, the wireless device optionally determines in step S91 one or more DRBs preferable for reestablishment following detection of radio link failure. The wireless device initiates the reestablishment procedure by transmitting S92 a request for reestablishment, e.g. a request Si41 as illustrated in FIG. 4a, on a signaling radio bearer, e.g. SRB0. If the wireless device has determined one or more preferred DRBs, information on preferred DRBs is included in the request transmitted to the RBS. According to an aspect of the disclosure, such a request could be considered in the context of the signaling diagram illustrated in FIG. 4a and for the reestablishment procedure. Thus, transmission/receipt of a request Si41 RRCConnectionReestablishmentRequest represents one possibility to initiate the quick RRC connection reestablishment.

The RRC connection re-establishment procedure is initialized when the wireless device detects any of the following: radio link failure, handover failure, mobility from E-UTRA failure, integrity check failure indication from lower layers, or an RRC connection reconfiguration failure.

According to another aspect of the disclosure, the wireless device indicates as part of the RRCConnectionReestablishmentRequest, the DRBs it requests to be subject to quick re-establishment. The target eNB selects which DRBs to quickly re-establish in consideration of the information from the wireless device.

In one exemplifying implementation, the RadioResourceConfigDedicated information element could be changed in the sense that Cond HO-to EUTRA also encompasses RRC connection reestablishments including DRB reestablishments without any reconfiguration, and the only allowed information element in this case is the DRB Identity.

| - | RadioResourceConfigDedicated ::= | SEQUENCE { | | |
|---|---|---|---|---|
| - | srb-ToAddModList | SRB-ToAddModList | OPTIONAL, | -- Cond HO-Conn |
| - | drb-ToAddModList | DRB-ToAddModList | OPTIONAL, | -- Cond HO-toEUTRA |
| - | drb-ToReleaseList | DRB-ToReleaseList | OPTIONAL, | -- Need ON |
| - | mac-MainConfig | CHOICE { | | |
| - | explicitValue | MAC-MainConfig, | | |
| - | defaultValue | NULL | | |
| - | } | OPTIONAL, | | -- Cond HO-toEUTRA2 |

| | | | |
|---|---|---|---|
| - sps-Config<br>ON | SPS-Config | OPTIONAL, | -- Need |
| - physicalConfigDedicated<br>Need ON | PhysicalConfigDedicated | OPTIONAL, | -- |
| - ..., | | | |
| - [[ rlf-TimersAndConstants-r9<br>ON | RLF-TimersAndConstants-r9 | OPTIONAL | -- Need |
| - ]], | | | |
| - [[ measSubframePatternPCell-r10<br>ON | MeasSubframePatternPCell-r10 | OPTIONAL | -- Need |
| - ]], | | | |
| - [[ neighCellsCRS-Info-r11<br>- Need ON | NeighCellsCRS-Info-r11 | | OPTIONAL - |
| - ]] | | | |
| - } | | | |

| | | | | |
|---|---|---|---|---|
| DRB-ToAddModList ::= | | SEQUENCE (SIZE (1..maxDRB)) OF DRB-ToAddMod | | |
| - | | | | |
| - DRB-ToAddMod ::= | SEQUENCE { | | | |
| - eps-BearerIdentity<br>DRB-Setup | | INTEGER (0..15) | OPTIONAL, | -- Cond |
| - drb-Identity | | DRB-Identity, | | |
| - pdcp-Config<br>Cond PDCP | | PDCP-Config | OPTIONAL, | -- |
| - rlc-Config | | RLC-Config | OPTIONAL, | -- Cond Setup |
| - logicalChannelIdentity<br>Cond DRB-Setup | | INTEGER (3..10) | OPTIONAL, | -- |
| - logicalChannelConfig | | LogicalChannelConfig | OPTIONAL, | -- Cond Setup |
| - ... | | | | |
| - } | | | | |

The condition Cond HO-toEUTRA can be modified according to:

| | |
|---|---|
| HO-toEUTRA | The field is mandatory present in case of handover to E-UTRA or when the fullConfig is included in the RRCConnectionReconfiguration message; In case of RRC connection establishment the field is not present and of RRC connection re-establishment the field is only present if DRBs are re-established without reconfigurations; otherwise the field is optionally present, need ON. |

In step S93, the wireless device receives information on the selected one or more DRBs, e.g. one or more of the DRBs previously indicated in the request message sent from the wireless device, in a radio link reestablishment response message Si42 received from the target RBS/eNB. The information on one or more selected DRBs is received S93 in the wireless device. According to an aspect of the disclosure, the wireless device optionally validates in step S94 the received information from the RBS/eNB. This can be interpreted as a validating the RBS/eNB. In step S95, the wireless device reestablishes S95 the selected one or more DRBs as indicated in the response Si42 received from the radio base station serving the wireless device prior to the radio link failure. When including the step S94 of validating the RBS/eNB, the step S95 of re-establishing the one or more DRBs is conditional upon successful validation in step S94. In a further step S96, the wireless device confirms Si43 the reception of the re-establishment information. Such confirmation could also comprise confirming reestablishment of the DRBs by transmitting S96 a confirmation Si43 to the RBS.

Figure 4B:
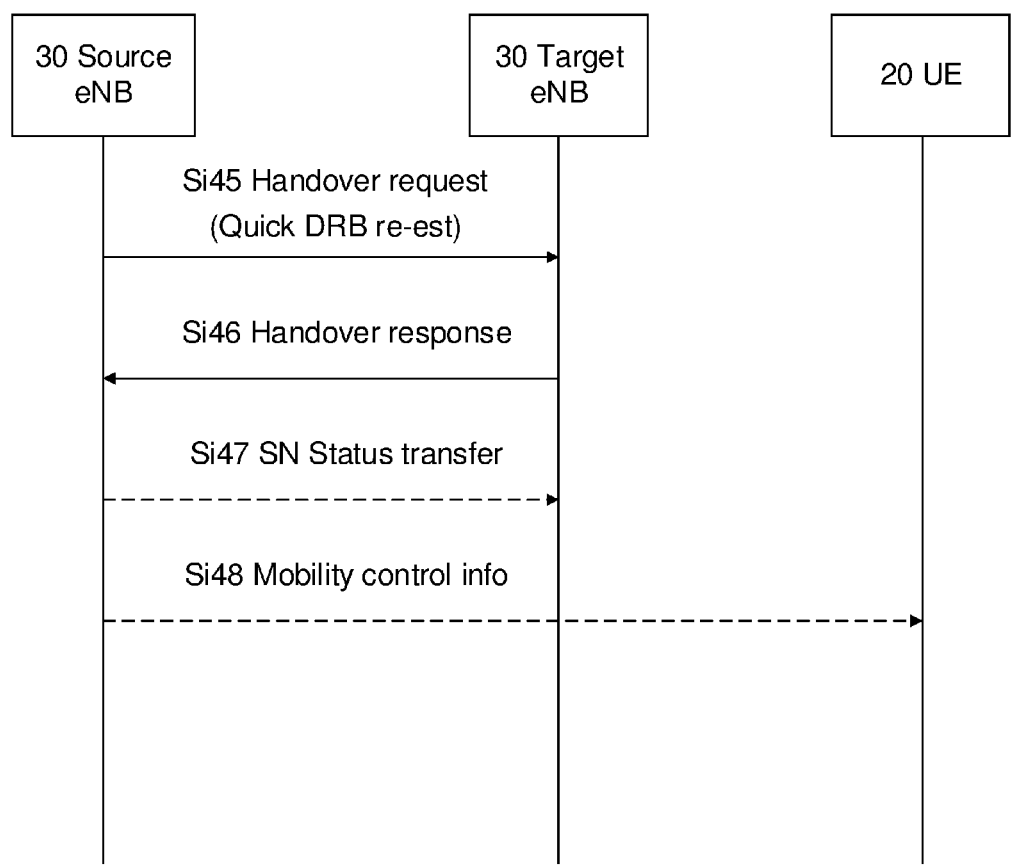

Turning now to FIG. 4b, an illustration is provided of a signaling flow for RRC connection reestablishment at handover failure. As in the previous example, the reestablishment procedure is initiated upon receipt of a request for reestablishment in a serving RBS, i.e. the source eNB, from the wireless device detecting a need for reestablishment of the radio link. Thus, information is received in a handover message from a source radio base station on one or more data radio bearers eligible for quick re-establishment, e.g. in a handover request message Si45 or in an optional Sequence Number, SN, status transfer Si47.

If the target eNB cannot support quick re-establishment, then it can indicate so in the handover response message Si46 to the source eNB. It may also indicate if the support is temporary or permanent.

The source eNB issues a handover request message Si45 to the target eNB passing necessary wireless device information to prepare the HO at the target side, i.e. UE X2 signaling context reference at source eNB, UE S1 EPC signaling context reference, target cell ID, $K_{eNB}$, RRC context including the Cell Radio Network Temporary Identifier, C-RNTI, of the wireless device in the source eNB, AS-configuration, E-RAB context and physical layer ID of the source cell+short MAC-I for possible RLF recovery and UE. In accordance with the disclosure, the handover request message includes information on one or more DRBs applicable for the present radio link between the wireless device and the source eNB, thereby transferring information possible to use for DRB reestablishment in the target eNB as part of the handover process. The UE X2/UE S1 signaling references enable the target eNB to address the source eNB and the EPC. The E-RAB context includes necessary RNL and TNL addressing information, and QoS profiles of the E-RABs.

Admission Control may be performed by the target eNB depending on the received E-RAB Quality of Service, QoS, information to increase the likelihood of a successful HO, if the resources can be granted by target eNB. The target eNB configures the required resources according to the received E-RAB QoS information and reserves a Cell Radio Network Temporary Identifier, C-RNTI, and optionally a, Random Access Channel, RACH preamble.

The target eNB prepares HO with L1/L2 and sends a handover response message Si46 to the source eNB. The handover response message Si46 includes a transparent container to be sent to the wireless device as an RRC message to perform the handover. If the target eNB cannot support quick re-establishment, then it can indicate so in the handover response Si46 to the source eNB. It may also indicate if the support is temporary or permanent. The container includes a new C-RNTI, target eNB security algorithm identifiers for the selected security algorithms, may include a dedicated RACH preamble, and possibly some other parameters i.e. access parameters, SIBs, etc. The HANDOVER REQUEST ACKNOWLEDGE message may also include RNL/TNL information for the forwarding tunnels, if necessary.

The target eNB generates the RRC message to perform the handover, i.e. RRCConnectionReconfiguration message including the mobilityControlInformation, to be sent by the source eNB towards the UE. The source eNB performs the necessary integrity protection and ciphering of the message. The wireless device receives the RRCConnectionReconfiguration message with necessary parameters, e.g., new C-RNTI, target eNB security algorithm identifiers, and optionally dedicated RACH preamble, target eNB SIBS, etc., and is commanded by the source eNB to perform the HO. The wireless device does not need to delay the handover execution for delivering the HARQ/ARQ responses to source eNB.

In accordance with an another option, the source eNB optionally sends the SN STATUS transfer message Si47 to the target eNB to convey the uplink PDCP SN receiver status and the downlink PDCP SN transmitter status of E-RABs for which PDCP status preservation applies, i.e. for RLC AM. The uplink PDCP SN receiver status includes at least the PDCP SN of the first missing UL SDU and may include a bit map of the receive status of the out of sequence UL SDUs that the wireless device needs to retransmit in the target cell, if there are any such SDUs. The downlink PDCP SN transmitter status indicates the next PDCP SN that the target eNB shall assign to new SDUs, not having a PDCP SN yet. Consequently, SN STATUS Transfer is signaled from source eNB to target eNB before the source eNB signals the mobility control info Si48 to the UE. The target eNB will have the corresponding information as the source eNB at time of re-establishment including the pre-configured wireless device information enabling selection of one or more DRBs. In accordance with a further aspect of the disclosure, the source eNB could also include an indication to a target eNB which of the DRBs that could or should be considered for quick re-establishment. In one mode of the embodiment, this indication is given per DRB as part of the Handover Request message. According to a further aspect of the disclosure, the SN STATUS transfer Si47 is signaled together, or as part of the handover request Si45.

During the quick re-establishment procedure the UE and target eNB exchange information regarding the DRBs they establish. According to the current E-UTRA RRC specification, TS 36.331 v.9.10.0, information about DRB establishment is only exchanged over integrity protected SRBs; that is, over SRB1 or SRB2. Turning back to FIG. 4a illustrating the reestablishment procedure, the request Si41 RRCConnectionReestablishmentRequest and the response Si42 RRCConnectionReestablishment, that carry the DRB information, are sent over a signaling radio bearer that lack integrity protection, i.e. SRB0.

FIG. 8 is a block diagram illustrating an example embodiment of a radio base station/eNB for performing the method step embodiments. The radio base station, RBS, 30 comprises a processor or processing circuitry 81, that may be constituted by any suitable Central Processing Unit, CPU, microcontroller, Digital Signal Processor, DSP, etc. capable of executing computer program code. The computer program may be stored in a memory, MEM 83. The memory 83 can be any combination of a Random Access Memory, RAM, and a Read Only Memory, ROM. The memory 83 may also comprise persistent storage, which, for example, can be any single one or combination of magnetic memory, optical memory, or solid state memory or even remotely mounted memory. The RBS 30 further comprises a communication interface 84 to communicate with other radio network and core network nodes, and radio circuitry 82, said memory 83 containing instructions executable by said processor.

According to one aspect of the disclosure, the radio circuitry 82 is configured to receive a request for re-establishment of the radio link from a wireless device. The processor 81 is configured to select one or more radio bearers for re-establishment based on preconfigured wireless device information. The radio circuitry is further configured to transmit a radio link re-establishment response to the wireless device comprising information about the selected one or more DRBs and to receive a re-establishment confirmation from the wireless device, confirming re-establishment of the selected one or more DRBs.

According to one aspect, the disclosure further relates to a computer-readable storage medium, having stored thereon a computer program which when run in a radio base station, RBS, causes the radio base station to perform the disclosed method embodiments. When the above mentioned computer program is run in the processor of the RBS 30, it causes the RBS to receive S71 a request for re-establishment of the radio link from the UE; to select S72 one or more data radio bearers for re-establishment based on the pre-configured wireless device information; to transmit S73 a radio link re-establishment response to the wireless device comprising information about the selected one or more DRBs; and to receive S74 a re-establishment confirmation from the wireless device, confirming re-establishment of the selected one or more DRBs.

According to aspects of the disclosure, the processor is further configured to determine which DRBs that are subject to quick re-establishment, possibly in consideration of information received from the source eNB via the communication circuitry, from an Operation and Maintenance system, from the wireless device, as well as information associated to the DRBs such as QoS information.

According to another aspect, the processor 81 is configured to validate the requesting wireless device.

According to another aspect, the processor 81 is further configured to identify an integrity indication in the re-establishment confirmation and to validate the integrity of the re-establishment confirmation based on the identified integrity indication.

According to another option, the processor 81 is further configured to identify a message authentication code, MAC, in the re-establishment request and to validate the integrity of the re-establishment request based on the identified MAC.

According to another aspect, the communication interface 84 is configured to receive information about one or more DRBs eligible for quick reestablishment in a handover message from a source RBS 30*a*.

According to another aspect, the communication interface 84 is further configured to receive a security key for integrity algorithm operation in the message form the source RBS 30*a*.

The communication interface 84 is, in accordance with aspects of the disclosure, configured to receive a key for MAC calculations from the source base station. Furthermore, the communication interface 84 is configured to receive information from source eNB 30*a* about which DRBs that are subject to quick re-establishment, and/or key information concerning integrity algorithm operation. The information is forwarded to the processor 81.

The communication interface 84, is in accordance with aspects of the disclosure, configured to transmit information about one or more data radio bearers eligible for quick reestablishment in a handover message to a target RBS 30*b*. According to an aspect, the communication interface is further configured to include a security key for integrity algorithm operation in the information transmitted to the target RBS 30*b*.

The processor 81 is configured to manage integrity protection of the re-establishment signaling with the wireless device, either for both the RRC connection re-establishment request and RRC connection re-establishment messages, or only for the RRC connection re-establishment message.

The memory 83 is configured to store information related to processes described herein.

The radio circuitry 82, such as a transmitter and/or receiver, is configured to communicate with served UEs as well as UEs re-establishing the RRC connection. The radio circuitry is configured to transmit a message including an indication of one or more data radio bearers that can be re-established to a wireless device and configured to receive feedback from the wireless device upon a data radio bearer re-establishment completion.

The RBS 30 illustrated by the block diagram of FIG. 8 is operative both as a target base station and as a source base station in the context of this disclosure. A target base station in this context is the base station to which a wireless device requests the RRC connection to be re-established.

According to a further aspect of the disclosure, the processor 81 further comprises one or several of:

a data radio bearer, DRB, selection module 811 configured to select one or more DRBs capable of quick reestablishment based on preconfigured wireless device information;

a DRB reestablishment module 812, configured to reestablish data communication between the RBS and the wireless device over one or more DRBs, and an integrity validation module 813 configured to validate the integrity of one or more re-establishment messages.

The DRB selection module 811, the DRB reestablishment module 812 and the integrity validation module 813 are implemented in hardware or in software or in a combination thereof. The modules 811, 812 and 813 are according to one aspect implemented as a computer program stored in a memory 83 which run on the processor 81.

FIG. 10 is a block diagram illustrating an example embodiment of a wireless device/UE for performing the method step embodiments. The wireless device 20 comprises a processor or processing circuitry 110, that may be constituted by any suitable Central Processing Unit, CPU, microcontroller, Digital Signal Processor, DSP, etc. capable of executing computer program code. The computer program may be stored in a memory, MEM 130. The memory 130 can be any combination of a Random Access Memory, RAM, and a Read Only Memory, ROM. The memory 130 may also comprise persistent storage, which, for example, can be any single one or combination of magnetic memory, optical memory, or solid state memory or even remotely mounted memory. The wireless device 20 further comprises radio circuitry 120 for radio link communication with a serving radio base station and for reestablishing failed connections to previously serving or alternative radio base stations.

According to an aspect of the disclosure, the radio circuitry 120 is configured to transmit a request for reestablishment of the radio link to the RBS and to a radio link reestablishment response from the RBS, the reestablishment response including information on one or more data radio bearers selected for reestablishment. The processor 110 is configured to reestablish the selected one or more DRBs. The radio circuitry is further configured to transmit a reestablishment confirmation to the RBS.

According to one aspect the disclosure further relates to a computer-readable storage medium, having stored thereon a computer program which when run in the wireless device, causes the wireless device to perform the disclosed method embodiments. When the above mentioned computer program is run in the processor of the wireless device 20, it causes the wireless device to transmit a request for re-establishment of a radio link to an RBS; to receive information on one or more data radio bearers selected for re-establishment, based on the pre-configured wireless device information; to re-establish the selected one or more DRBs; and to transmit a re-establishment confirmation to the radio base station RBS.

The processor 110 is further configured to receive, from the target eNB via the radio circuitry, comprising a receiver, a message from a radio base station, RBS, which message indicates one or more data radio bearers that can be re-established, i.e. information about which DRBs that are subject to quick re-establishment.

The radio circuitry, such as a receiver, is configured to receive a message from a network node, e.g. a radio base station, RBS, which message indicates one or more data radio bearers that can be re-established. A processing unit/processor of the wireless device is configured to re-establish all or a subset of the indicated data radio bearers.

According to an aspect of the disclosure, the processor 110 is further configured to validate the RBS.

According to an option, the processor 110 is configured to include a security key in the transmitted request for reestablishment and to validate the integrity of the received reestablishment response based on the transmitted security key.

According to a further aspect of the disclosure, the processing unit is configured to handle integrity protection also for the RRC connection re-establishment messages.

According to an aspect of the disclosure, the processor 110 is further configured to determine one or more DRBs preferred for reestablishment and the radio circuitry 120 is further configured to transmit a reestablishment confirmation to the RBS.

In some embodiments, the processing unit is also configured to prepare a RRC connection re-establishment request message including an indication of which DRBs that should be subject to quick re-establishment.

According to a further aspect of the disclosure, the processor 110 further comprises one or several of:

a DRB reestablishment request module 111 configured to request DRB reestablishment;

a DRB information retrieval module 112, configured to retrieve information on one or more DRBs selected for reestablishment from a received reestablishment response;

a DRB reestablishment module 113, configured to reestablish the one or more DRBs, and an integrity validation module 114 configured to validate the integrity of one or more re-establishment messages.

The DRB reestablishment request module 111, the DRB information retrieval module 112, the DRB reestablishment module 113 and the integrity validation module 114 are implemented in hardware or in software or in a combination thereof. The modules 111, 112, 113 and 114 are according to one aspect implemented as a computer program stored in a memory 130 which run on the processor 110.

The disclosed mechanism applies to general cells served by general base stations, even though the considered example is based on macro and Pico eNBs. In WCDMA, this would be implemented in RNC, which could consider forwarding packets to a NodeB where a wireless device is re-establishing the connection, and quickly re-establish an RRC connection.

The invention claimed is:

1. A method, performed in a radio base station, RBS, of reestablishing a data radio bearer, DRB, with a wireless device following radio link failure, the radio base station having pre-configured wireless device information, the method comprising:
    receiving a request for re-establishment of the radio link from the wireless device;
    selecting one or more DRBs for re-establishment based on the pre-configured wireless device information;
    transmitting a radio link re-establishment response to the wireless device comprising information about the selected one or more DRBs; and
    receiving a re-establishment confirmation from the wireless device, confirming re-establishment of the selected one or more DRBs,
    wherein the DRBs possible to re-establish without modifications are selected for re-establishment.

2. The method of claim 1, further comprising:
    validating the requested wireless device.

3. The method of claim 2, wherein the validating comprises validating the integrity of the re-establishment confirmation based on an integrity indication received in the confirmation.

4. The method of claim 3, wherein validating the integrity comprises validating the integrity of the re-establishment request based on a message authentication code received in the request.

5. The method of claim 1, wherein the request for reestablishment of the radio link is received on a signaling radio bearer.

6. The method of claim 5, wherein the received request for re-establishment of the radio link includes information on one or more data radio bearers preferred for re-establishment.

7. The method of claim 6, wherein the request for re-establishment of the radio link is received in an RRC Connection Reestablishment Request during a RRC connection re-establishment procedure.

8. The method of claim 1, wherein the reestablishment response comprising information to the wireless device on the selected one or more data radio bearers is transmitted on a signaling radio bearer.

9. The method of claim 8, wherein a DRB identity is included in an Information Element RadioResourceConfigDedicated/HO-toEUTRA in the reestablishment response.

10. The method of claim 1, wherein the reestablishment confirmation from the wireless device is an RRC Connection Reestablishment Complete message on a signaling radio bearer.

11. The method of claim 1, wherein DRBs are selected for re-establishment based on quality of service parameters of the DRBs.

12. The method of claim 11, wherein the quality of service parameters comprise latency.

13. The method of claim 1, wherein the information on the selected one or more DRBs includes DRB identity of each of the selected DRBs.

14. The method of claim 1, further comprising
    receiving a security key in the radio base station; and
    protecting the integrity of information transmitted to the wireless device based on the received security key.

15. The method of claim 1, further comprising transmitting information for integrity verification on a re-established signaling radio bearer.

16. A method, performed in a radio base station, RBS, of reestablishing a data radio bearer, DRB, with a wireless device following radio link failure, the radio base station having pre-configured wireless device information, the method comprising:
    receiving a request for re-establishment of the data radio bearer following the radio link failure from the wireless device;
    selecting one or more DRBs for re-establishment based on the pre-configured wireless device information;
    transmitting a radio link re-establishment response to the wireless device comprising information about the selected one or more DRBs;
    receiving a re-establishment confirmation from the wireless device, confirming re-establishment of the selected one or more DRBs; and
    receiving information in a handover message from a source radio base station on one or more data radio bearers eligible for quick re-establishment.

17. The method of claim 16, wherein the information received in the handover message is received in a Handover Request message or in a Sequence Number, SN, status transfer.

18. A radio base station for re-establishing a data radio bearer, DRB, with a wireless device, following radio link failure, the radio base station having pre-configured wireless device information, the radio base station comprising a processor, a communication interface, a memory and radio circuitry, said memory containing instructions executable by said processor, whereby said radio base station is operative to:
    receive a request for re-establishment of the radio link from the wireless device;
    select one or more data radio bearers for re-establishment based on the pre-configured wireless device information;
    transmit a radio link re-establishment response to the wireless device comprising information about the selected one or more DRBs; and
    receive a re-establishment confirmation from the wireless device, confirming re-establishment of the selected one or more DRBs,
    wherein the DRBs possible to re-establish without modifications are selected for re-establishment.

19. A method, performed in a wireless device, of re-establishing a data radio bearer, DRB, following radio link failure, with a radio base station, RBS, having preconfigured wireless device information, the method comprising:
  transmitting a request for re-establishment of the radio link to the RBS;
  receiving a radio link reestablishment response from the RBS comprising information on one or more data radio bearers selected for re-establishment, based on the pre-configured wireless device information;
  re-establishing the radio link with the selected one or more DRBs; and
  transmitting a re-establishment confirmation to the RBS upon re-establishing the radio link with the selected one or more DRBs,
  wherein the DRBs are selected for reestablishment based on quality of service parameters of the DRBs.

20. The method claim 19, further comprising:
  validating the RBS.

21. The method of claim 20, wherein the transmitted request for re-establishment of the radio link includes a security key, and wherein the validating comprises validating the integrity of the received radio link reestablishment response based on the security key.

22. The method of claim 19, wherein the request for reestablishment of the radio link is transmitted on a signaling radio bearer.

23. The method of claim 22, wherein the reestablishment confirmation from the wireless device is transmitted in an RRC Connection Reestablishment Complete message on a signaling radio bearer.

24. The method of claim 19, further comprising determining one or more DRBs preferred for re-establishment and including the information on preferred DRBs in the transmitted request.

25. A radio base station, RBS, for re-establishing a data radio bearer, DRB, with a wireless device, following radio link failure, the radio base station having pre-configured wireless device information, the radio base station comprising:
  radio circuitry configured to receive a request for re-establishment of the radio link from the wireless device;
  a processor configured to select one or more radio bearers for reestablishment based on preconfigured wireless device information;
  the radio circuitry further being configured to transmit a radio link re-establishment response to the wireless device comprising information about the selected one or more DRBs and to receive a re-establishment confirmation from the wireless device, confirming re-establishment of the selected one or more DRBs; and
  a communication interface configured to receive information about one or more data radio bearers eligible for quick re-establishment in a handover message from a source RBS.

26. The radio base station of claim 25, wherein the processor further is configured to validate the requesting wireless device.

27. The radio base station of claim 25, wherein processor is further configured to identify an integrity indication in the re-establishment confirmation and to validate the integrity of the re-establishment confirmation based on the identified integrity indication.

28. The radio base station of claim 25, wherein the processor is further configured to identify a message authentication code, MAC, in the reestablishment request and to validate the integrity of the re-establishment request based on the identified MAC.

29. The radio base station of claim 25, wherein the communication interface is further configured to receive a security key for integrity algorithm operation in the message from the source RBS.

30. The radio base station of claim 25, further comprising a communication interface configured to transmit information about one or more data radio bearers eligible for quick re-establishment in a handover message to a target RBS.

31. The radio base station of claim 30, wherein the communication interface is further configured to transmit a security key for integrity algorithm operation in the message to the target RBS.

32. A wireless device for re-establishing a data radio bearer, DRB, following radio link failure, with a radio base station, RBS, the wireless device comprising:
  radio circuitry configured to transmit request for re-establishment of the radio link to the RBS and to receive radio link reestablishment response from the RBS, the reestablishment response including information on one or more data radio bearers selected for re-establishment;
  a processor having preconfigured wireless device information and configured to re-establish the selected one or more DRBs; and
  the radio circuitry being further configured to transmit a re-establishment confirmation to the RBS
  wherein the DRBs are selected for reestablishment based on quality of service parameters of the DRBs.

33. The wireless device of claim 32, wherein the processor is further configured to determine one or more DRBs preferred for re-establishment and wherein the radio circuitry is further configured to include information on the preferred DRBs in the transmitted request.

34. The wireless device of claim 32, wherein the processor is further configured to validate the RBS.

35. The wireless device of claim 32, wherein the processor is further configured to include a security key in the transmitted request for reestablishment and to validate the integrity of the received reestablishment response based on the transmitted security key.

* * * * *